United States Patent
Stancliffe

(10) Patent No.: US 7,204,878 B2
(45) Date of Patent: Apr. 17, 2007

(54) REFRACTORY MIXES CONTAINING CONDENSED TANNIN AND FURFURYL ALCOHOL, AND THEIR USES

(75) Inventor: Mark R. Stancliffe, Bromyard (GB)

(73) Assignee: Ashland Licensing and Intellectual Property LLC, Dublin, OH (US)

( * ) Notice: Subject to any disclaimer, the term of this patent is extended or adjusted under 35 U.S.C. 154(b) by 0 days.

(21) Appl. No.: 11/247,987

(22) Filed: Oct. 11, 2005

(65) Prior Publication Data

US 2006/0084564 A1 Apr. 20, 2006

Related U.S. Application Data

(60) Provisional application No. 60/618,927, filed on Oct. 14, 2004.

(51) Int. Cl.
| | |
|---|---|
| *C04B 35/632* | (2006.01) |
| *C04B 26/10* | (2006.01) |
| *B28B 1/00* | (2006.01) |
| B22C 1/16 | (2006.01) |
| B22C 1/22 | (2006.01) |

(52) U.S. Cl. .............. 106/287.2; 501/90; 501/94; 501/99; 501/100; 501/101; 501/109; 501/127; 501/128; 501/133; 264/29.1; 264/30; 264/331.11; 264/667; 523/140; 523/141; 523/144

(58) Field of Classification Search ........... 501/94, 501/90, 99–101, 109, 127, 128, 133; 106/287.2; 264/29.1, 30; 234/331.11, 667; 523/140, 523/141, 144

See application file for complete search history.

(56) References Cited

U.S. PATENT DOCUMENTS 4,357,194 A * 11/1982 Stofko ................. 156/308.6
2004/0115455 A1 * 6/2004 Quist et al. ............ 428/500

OTHER PUBLICATIONS

"Natural Tannin-Based Adhesives for Wood Products of Low or No Formaldehyde Emission", FAIR, www.biomatnet.org/secure/Fair/F340.htm, Jan. 1999.*
Foo et al, "Condensed Tannins: Reactions of Model Compounds with Furfuryl Alcohol and Furfuraldehyde", Journal of Wood Chemistry and Technology, 5(1), pp. 135-158, 1985, no month available>.*
Trosa et al, "Industrial hardboard and other panels binder from tannin/furfuryl alcohol in absence of formaldehyde", Holz Als Roh- und Werkstoff, 56, pp. 213-214, 1998, no month available.*

* cited by examiner

*Primary Examiner*—David M. Brunsman
(74) *Attorney, Agent, or Firm*—David L. Hedden

(57) ABSTRACT

This invention relates to refractory mixes produced by mixing a refractory material with an organic binder and heating to a temperature of typically from about 50° C. to about 100° C. to form a stable composite granulate. The refractor mixes comprise a major amount of a refractory material and a minor amount of a binder composition comprising (a) condensed tannin and (b) furfuryl alcohol. The refractory mixes are used to prepare shaped (e.g. bricks) and unshaped (e.g. blast furnace tap holes, troughs, and tundish liners) refractory products. The invention also relates to a process for preparing the refractory products using the refractory mixes.

11 Claims, No Drawings

REFRACTORY MIXES CONTAINING CONDENSED TANNIN AND FURFURYL ALCOHOL, AND THEIR USES

CLAIM TO PRIORITY

This application claims the benefit of U.S. Provisional Application No. 60/618,927 filed on Oct. 14, 2004, the contents of which are hereby incorporated into this application.

TECHNICAL FIELD OF THE INVENTION

This invention relates to refractory mixes produced by mixing a refractory material with an organic binder and heating to a temperature of typically from about 50° C. to about 100° C. to form a stable composite granulate. The refractory mixes comprise a major amount of a refractory material and a minor amount of a binder composition comprising (a) condensed tannin and (b) furfuryl alcohol. The refractory mixes are used to prepare shaped (e.g. bricks) and unshaped (e.g. blast furnace tap holes, troughs, and tundish liners) refractory products. The invention also relates to a process for preparing the refractory products using the refractory mixes.

BACKGROUND OF THE INVENTION

The iron and steel industry are the main users of refractory products, e.g. shaped products such as bricks made from magnesia, dolomite, bauxite, and andalusite, and unshaped products used for blast furnace tap holes, troughs, and tundish liners. Typically, the products are made under pressure (isostatically) and synthetic resins (phenolic resins and furan resins) are used as binders.

The materials used in the refractory products must be such that the mixing of the oxide-based refractory components with graphite and other additives, as well as 10–20% of added binder, yields a fine-grained, homogeneous granulate, which can be charged into the isostatic compression pattern without separation occurring. Furthermore, the mix must be dried to a certain extent to produce a free flowing, storable granulate.

Although there are some technologies available that satisfy these requirements, they are often associated with environmental, health, and safety issues. Therefore, there is a need for a binder, which in addition to providing the performance aspects required for the majority of refractory compositions, also provides improved environmental, health, and safety benefits in terms of emissions, exposures, and life cycle environmental impact.

All citations referred to in this application are expressly incorporated by reference.

BRIEF SUMMARY OF THE INVENTION

This invention relates to refractory mixes produced by mixing a refractory material with an organic binder and heating to a temperature of typically from about 50° C. to about 100° C. to form a stable composite granulate. The refractory mixes comprise a major amount of a refractory material and a minor amount of a binder composition comprising (a) condensed tannin and (b) furfuryl alcohol. The refractory mixes are used to prepare shaped (e.g. bricks) and unshaped (e.g. blast furnace tap holes, troughs, and tundish liners) refractory products. The invention also relates to a process for preparing the refractory products using the refractory mixes.

Because the furfuryl alcohol and the condensed tannin react when the condensed tannin is dissolved in furfuryl alcohol at temperatures>40° C., it is not necessary to use a catalyst to cure the refractory mix.

Because it is not necessary to use binder components that contain free formaldehyde or free phenol, a refractory mix can be prepared that can be charged into the isostatic compression pattern where it is shaped and allowed to cure.

Preferably, the binder contains 0% free phenol, 0% free formaldehyde, and 0% nitrogen.

DETAILED DESCRIPTION OF THE INVENTION

The detailed description and examples will illustrate specific embodiments of the invention and will enable one skilled in the art to practice the invention, including the best mode. It is contemplated that many equivalent embodiments of the invention will be operable besides these specifically disclosed.

Condensed tannins, also known as protoanthocyanidins, are polymeric flavanoids extracted from plants, e.g. roots, bark, shoots, or leaves of the plant. The condensed tannins used in the binder composition typically have an average molecular weight of from about 500 to about 50,000, preferably from about 1,000 to about 25,000, most preferably from about 1,000 to about 10,000. The condensed tannins typically have a viscosity of from about 0.1 poise to about 200 poises, preferably from about 1.0 poise to about 100 poises, most preferably from about 5 poises to about 100 poises.

The preferred condensed tannin, tannin from the Quebracho tree of sulfonated quebracho, is derived from the core of the tree of the genus *Schinopsis*, which is abundant in Argentina and Paraguay. It constitutes about 30% of the dry weight of the wood from the core and is easily extracted by means of hot water.

The binder is preferably prepared by mixing the condensed tannin with furfuryl alcohol such that the amount of condensed tannin is typically from about 0.5 weight percent to about 50 weight percent, based upon the weight percent of the mixture of condensed tannin and furfuryl alcohol, preferably from about 20 weight percent to about 40 weight percent, most preferably from about 25 weight percent to about 35 weight percent.

A refractory material can be defined as a product composed of materials with a softening point of that is typically greater than 1500° C. Although any refractory can be used to prepare the refractory mix, preferably used are refractories selected from the group consisting of silicon carbide, silicates, magnesia, dolomite, bauxite, andalusite, and mixtures thereof. The refractories or softening point, of the mix is of obvious importance and is largely dictated by the blend of refractories used. In addition to the refractory, the refractory mix preferably contains carbon-containing material, particularly graphite and/or carbon black up to 20%. The graphite content has an impact on other properties, including resistance to thermal shock and slag, thereby increasing wear resistance and service life.

The amount of binder used in an amount that is effective in producing a shape that can be handled or is self-supporting after curing. Typically, the amount of binder is generally from about 1.0% to about 25.0% by weight based upon the weight of the refractory, preferably from about 5.0% to about 20.0% by weight.

Although it is possible to mix the components of the binder with the refractory in various sequences, it is preferred to mix the Quebracho and furfuryl alcohol before applying them to the refractory.

The temperatures of the mix is raised by the friction of mixing friction or external heating to between 50° C. and 100° C. At this temperature the curing reaction between the Quebracho and furfuryl alcohol is accelerated sufficiently to form a dry but plastic granulate which normally occurs between 15 and 60 minutes mixing. The finished mix must be a dry free flowing granulate, which is storage stable at room temperature.

A shape is typically formed by isostatically pressing the granulate into a pattern at room temperature at pressures between 80–200 N/mm$^2$. The green shapes are then fully cured by slowly increasing the temperature at 80° C. to 180° C. at a rate of 10° C. to 30° C. per hour, followed by carbonization in the absence of air at temperatures ranging up to about 800° C., which generates the necessary binding carbon skeleton which significant increases strength and wear resistance.

EXAMPLE

A refractory mix is prepared by mixing a refractory, e.g. silicon carbide, silicates, magnesia, dolomite, bauxite and andalusite along with carbon in the form of graphite and carbon black, and the resin components either as individual addition i.e. Quebracho and furfural alcohol or as pre-blend of Quebracho dissolved in furfuryl alcohol. The total resin addition can be between 1 and 25% and the weight ratio of Quebracho to furfuryl alcohol is from about 5 to 40 weight percent based upon the total weight of the Quebracho and furfuryl alcohol.

The choice of resin addition and ratio of Quebracho to furfuryl alcohol depends on the refractory formulation and is such that a satisfactory fine-grained, homogenous granulate results that can be charged into an isostatic compression pattern without separation occurring.

The temperature of the refractory mix is increased by the friction of mixing or external heating to from about 50° C. to about 100° C. At this temperature the curing reaction between the Quebracho and furfuryl alcohol is accelerated sufficiently to form a dry but plastic granulate, which normally occurs from 15 and 60 minutes after mixing. The normal drying phase required when conventional novalac and furfural resin mixtures are used may be reduced or avoided because the furfuryl alcohol is largely consumed in the reaction. The finished mix must be a dry free flowing, storable granulate.

The granulate can now be isostatically pressed into a pattern at room temperature at pressures between 80–200 N/mm$^2$. The green shapes are removed from the tooling and then fully cured by slowly increasing the temperature to 80° C. to 180° C. at a rate of 10° C. to 30° C. per hour, followed by carbonization in the absence of air at temperatures ranging up to about 800° C.

I claim:

1. A heated refractory mix comprising:
   (a) a major amount of a refractory,
   (b) a condensed tannin; and
   (b) furfuryl alcohol,
   such that the temperature of the refractory mix is from about 50° C. to about 100° C.

2. The refractory mix of claim 1 wherein the amount of condensed tannin is from about 1.0 weight percent to about 50 weight percent, based upon the weight percent of the mixture of condensed tannin and furfuryl alcohol.

3. The refractory mix of claim 2 wherein the amount of condensed tannin is from about 10 weight percent to about 40 weight percent, based upon the weight percent of the mixture of condensed tannin and furfuryl alcohol.

4. The refractory mix of claim 3 wherein the average molecular weight of the condensed tanin is from about 1,000 to about 25,000 and the viscosity is from about 5 poises to about 100 poises.

5. The refractory mix of claim 4 wherein the condensed tanin is tannin from the Quebracho tree.

6. The refractory mix of claim 5 which also contains a carbon-containing material.

7. The refractory mix of claim 6 wherein the carbon-containing material is selected from the group consisting of graphite, carbon black, and mixtures thereof.

8. A refractory mix of claim 1, 2, 3, 4, 5, 6, or 7 which is allowed to dry for a time sufficient to form free flowing, storage stable granulates.

9. The refractory mix of claim 8 wherein said drying time is from 15 minutes to 60 minutes.

10. A process for making a refractory product comprising:
    (a) adding the refractory mix of claim 9 to a pattern; and
    (b) subjecting the refractory mix to a pressure of from about 80 N/mm$^2$ to about 200 N/mm$^2$ to form a handleable product.

11. The process of claim 10 wherein the handleable product is gradually subjected to increasing temperatures up to 180° C. followed by carbonization in the absence of air at temperatures up to about 800° C.

* * * * *